US006823384B1

(12) United States Patent
Wilson et al.

(10) Patent No.: US 6,823,384 B1
(45) Date of Patent: Nov. 23, 2004

(54) METHODS AND APPARATUS FOR SECURELY COLLECTING CUSTOMER SERVICE AGENT DATA IN A MULTI-TENANT ENVIRONMENT

(76) Inventors: James Wilson, 8175 Lyndhurst Ct., Cincinnati, OH (US) 45249; Mark Richey, 2960 Erie Ave., Cincinnati, OH (US) 45208

( * ) Notice: Subject to any disclaimer, the term of this patent is extended or adjusted under 35 U.S.C. 154(b) by 0 days.

(21) Appl. No.: 09/419,038

(22) Filed: Oct. 15, 1999

(51) Int. Cl.$^7$ ............................................. G06F 15/173
(52) U.S. Cl. ...................... 709/225; 709/203; 709/206; 709/207; 709/238; 709/215; 379/265.02; 379/265.12
(58) Field of Search ................................ 709/238, 203, 709/215, 224, 206, 207; 379/265.12, 219, 309, 265.02

(56) References Cited

U.S. PATENT DOCUMENTS

| | | | | |
|---|---|---|---|---|
| 5,619,557 A | * | 4/1997 | Van Berkum | 379/245 |
| 5,621,789 A | | 4/1997 | McCalmont et al. | 379/265 |
| 5,742,675 A | * | 4/1998 | Kilander et al. | 379/266.09 |
| 5,778,060 A | | 7/1998 | Otto | 379/265 |
| 5,793,861 A | | 8/1998 | Haigh | 379/266 |
| 5,796,791 A | | 8/1998 | Polcyn | 379/265 |
| 5,848,143 A | | 12/1998 | Andrews et al. | 379/219 |
| 5,864,616 A | | 1/1999 | Hartmeier | 379/266 |
| 5,867,495 A | | 2/1999 | Elliott et al. | 370/352 |
| 5,878,130 A | | 3/1999 | Andrews et al. | 379/265 |
| 5,884,032 A | | 3/1999 | Bateman et al. | 395/200.34 |
| 5,907,608 A | | 5/1999 | Shaffer et al. | 379/220 |
| 5,914,951 A | | 6/1999 | Bentley et al. | 370/352 |
| 5,915,011 A | | 6/1999 | Miloslavsky | 379/219 |
| 6,128,646 A | * | 10/2000 | Miloslavsky | 358/402 |
| 6,222,919 B1 | * | 4/2001 | Hollatz et al. | 379/265.12 |

OTHER PUBLICATIONS

Brochure—GEOTEL-*Enterprise Web*™, "Opening the Call Center to the Internet" GEOTEL Communications Corporation, 1999.
Brochure—GEOTEL Professional Services, "Maximize the Value of Your GEOTEL Investment", GEOTEL Communications Corporation, 1999.
Brochure—*Profiles In Success*–Continental Airlines, "Continental Airlines Soars with the GEOTEL Intelligent Call-Router™", GEOTEL Communications Corporation, 1998.
Brochure—*Profiles In Success*–J.C. Penney Insurance, "J.C. Penney Courts Customers with Quality", GEOTEL Communications Corporation, 1998.
Brochure—GEOTEL Intelligent CallRouter™, "Delivering the Right Information to the Right Resource for Every Customer Interaction", GEOTEL Communications Corporation, 1999.

(List continued on next page.)

Primary Examiner—Glenton B. Burgess
Assistant Examiner—Kevin Parton
(74) Attorney, Agent, or Firm—Bell Boyd & Lloyd LLC (57) ABSTRACT

A system for securely collecting customer service agent data in a multi-tenant environment is provided. Generally, a plurality of customers send a plurality of messages to a server. Several different media types may be used to communicate with the server. The server then selects one of a plurality of customer service agents to handle a particular message based on a determination of the targeted tenant's identity, a predetermined association between the agent and the tenant, and the agent's availability. The server then routes the message and a "screen pop" to the selected agent. The selected agent then transmits information back to the server where it is stored in a secure memory partition associated with the targeted tenant. When a particular customer/agent session ends, the agents access to the secure memory partition is deactivated.

7 Claims, 8 Drawing Sheets

OTHER PUBLICATIONS

Brochure—GEOTEL Enterprise CTI, "Bringing Enterprise Data to the Agent's Desktop", GEOTEL Communications Corporation, 1999.

Brochure—GEOTEL–*Enterprise IVR*™, "Maximizing IVR Value in the Virtual Call Center", GEOTEL Communications Corporation, 1999.

Brochure—GEOTEL Enterprise Reporting, "Converting Data into Business Intelligence", GEOTEL Communications Corporation, 1999.

Brochure—GEOTEL–*Enterprise Agent*™, "Expanding the Call Center Enterprise", GEOTEL Communications Corporation, 1999.

Brochure—"The Business Benefits of CTI", GEOTEL Communications Corporation, 1999.

* cited by examiner

| Agent ID | Agent Addresses | Skills | Availability | Active Permission for Memory Partition # |
|---|---|---|---|---|
| 1000001 | (312) 555-1001 | (513) 555-1234 | No | |
| 1000002 | (312) 555-1002 | (513) 555-1234 | Yes | |
| 1000003 | (312) 555-1003 | (513) 555-1234 | No | |
| ... | ... | ... | ... | ... |
| 1000104 | Ann@agents.com | orders@xyz.com | No | |
| 1000105 | Bob@agents.com | orders@xyz.com | Yes | 1 |
| 1000106 | Carl@agents.com | orders@xyz.com | No | |
| ... | ... | ... | ... | ... |
| 1000207 | (312) 555-1001; Doug@agents.com | (513) 555-1235; info@abc.com | Yes | 2 |

*Agent Database*

FIG. 4

Memory Partition for Tenant #1

| Session # | Timestamp | Destination Electronic Address | Agent ID | Agent Inputs | Statistics |
|---|---|---|---|---|---|
| 1 | 1/1/99:08:23 | (513) 555-1234 | 9000002 | Still having trouble with widget, will call back after trying new battery | 1.2 minutes |
| 2 | 1/1/99:08:24 | (513) 555-1234 | 9000003 | Order Form #1234, Name: John Doe, etc. | 9.8 minutes |
| ... | | | ... | ... | ... |

Memory Partition for Tenant #2

| Session # | Timestamp | Destination Electronic Address | Agent ID | Agent Inputs | Statistics |
|---|---|---|---|---|---|
| 1 | 1/1/99:08:23 | orders@xyz.com | 9000005 | Dear Customer: Your confirmation no. is 1234567 etc. | 5.4 minutes |
| 2 | 1/1/99:08:24 | orders@xyz.com | 9000006 | Dear Customer: Your confirmation no. is 1234568 etc. | 5.6 minutes |
| ... | | | ... | ... | ... |

METHODS AND APPARATUS FOR SECURELY COLLECTING CUSTOMER SERVICE AGENT DATA IN A MULTI-TENANT ENVIRONMENT

TECHNICAL FIELD OF THE INVENTION

The invention relates generally to customer service message routing systems, and more particularly, to methods and apparatus for electronically routing a communication event from a customer to a customer service agent and collecting agent inputs in a secure multi-media/multi-tenant environment.

BACKGROUND OF THE INVENTION

Often, potential customers may need to ask questions and/or supply information regarding a product or service offered by a particular business. Similarly, existing customers may have questions or complaints about a purchased product or service. For example, a student may wish to register for a seminar, or a computer user may need to know how to operate certain software. Typically, the customer makes a phone call to a phone number associated with the business and talks to a customer service agent. Or, the customer may prefer to send an e-mail message to an address associated with the business and receive a response from a customer service agent.

Of course, each business prefers to publish only one phone number and/or one e-mail addresses for this purpose, so that customers are not inconvenienced by a long list. However, a plurality of customer service agents may be needed to meet customer demand. In order to make one phone number or one e-mail address connect to one of many customer service agents, the customer's message (the phone call or the e-mail message) is commonly routed by a server to an available agent. The agent either works for the company or has been trained to handle customer messages related to certain products or services offered by that company.

The agent may then enter data associated with a call or an e-mail session. For example, the agent may enter the student's registration information, or the agent may enter notes about his discussion regarding the computer user's software problem. This data is then transmitted to the server for storage and/or processing.

These systems are well suited for large companies with steady call processing requirements. However, these systems may not be cost effective for small and/or extremely dynamic call processing. These systems do not allow a plurality of tenants using a plurality of message types to securely share a single system.

SUMMARY OF THE INVENTION

The present invention is directed to methods and apparatus for electronically routing a communication event from a customer to a customer service agent and collecting agent inputs in a secure multi-media/multi-tenant environment. A single system may be used to handle more than one tenant and more than one type of message, thereby allowing a plurality of relatively smaller tenants or tenants with dynamic message processing requirements to be aggregated into one cost effective system. Further, a single agent may easily handle different message types and/or customers of different tenants.

In accordance with an aspect of the invention, a method is provided for electronically routing a communication event from a customer to a customer service agent and collecting agent inputs in a secure multi-media/multi-tenant environment. The method correlates a first telephone number to a first computer memory partition. The first computer memory partition is associated with a first tenant. Similarly, the method correlates an e-mail address to a second computer memory partition. The second computer memory partition is associated with a second tenant. Preferably, the first tenant and the second tenant are distinct business entities. The method also correlates a first customer service agent to the first computer memory partition, and a second customer service agent to the second computer memory partition. Subsequently, a communication event is received from the customer. The communication event is then transmitted to the first customer service agent at a second telephone number if the communication event is directed to the first telephone number. Any inputs received from the first agent are then stored exclusively in the first computer memory partition. Similarly, any support interactions associated with the first agent originate from the first computer memory partition.

In some embodiments the method also includes the step of receiving first login information from the first customer service agent, and second login information from the second customer service agent. The first login information preferably includes a first agent identification code and the second telephone number. The second login information preferably includes a second agent identification code and a network address. In such an event, the communication event may be transmitted to the second customer service agent at the network address if the communication event is directed to the e-mail address. Further, inputs received from the second agent may be stored exclusively in the second computer memory partition. In some embodiments, a third customer service agent is correlated to the first computer memory partition and the second computer memory partition.

In accordance with another aspect of the invention, an apparatus for electronically routing communication events from customers to customer service agents and storing agent inputs is provided. Preferably, the apparatus includes a telephone interface circuit for electronically communicating with a telephone network and a network interface circuit for electronically communicating with the Internet. Further, the apparatus preferably includes a data storage device having a first memory partition associated with a first tenant and a second memory partition associated with a second tenant. The first tenant and the second tenant are preferably distinct business entities. The data storage device preferably stores a first destination address logically associated with the first memory partition and a second destination addresses logically associated with the second memory partition. Further, the data storage device preferably stores first agent input data logically associated with the first memory partition and second agent input data logically associated with the second memory partition. Still further, the apparatus preferably includes a controller operatively coupled to the telephone interface circuit, the network interface circuit, and the data storage device. Preferably, the controller causes a phone call to be routed from a first customer to a first customer service agent located at the first destination address using the telephone interface circuit. Then, the controller receives first agent inputs from the network interface circuit and causes the data storage device to store the first agent inputs in the first memory partition. Similarly, the controller may cause an e-mail message to be routed from a second customer to a second customer service agent located at the second destination address using the network interface circuit.

Subsequently, if the controller receives second agent inputs from the network interface circuit, the controller causes the data storage device to store the second agent inputs in the second memory partition.

DETAILED DESCRIPTION OF THE PREFERRED EMBODIMENTS

Generally, in a preferred embodiment of the present invention, a plurality of customers send a plurality of messages to a server or logical grouping of servers. Typically, the messages are associated with products or services offered by a particular business entity. Each business entity is considered a "tenant" of the server(s). Several different media types may be used to communicate with the server(s). For example, phone calls, e-mail messages, fax messages, or web chat messages may be used to communicate with the server(s). The server(s) then selects one of a plurality of customer service agents, which is most appropriate to handle a particular message. Agent selection is preferably based on a determination of the targeted tenant's identity, a predetermined association between the agent and the tenant, and the agent's availability. Other variables may also be used during agent selection, such as the customer's identity and the customer's history.

The server then routes the message to the selected agent. The server may also transmit a "screen pop" to a computer associated with the agent to convey information known or needed from the customer. The selected agent then enters new information into the computer, and the information is transmitted back to the server. The server then stores the new information from the agent in a secure memory partition associated with the targeted tenant. The predetermined association between the agent and the tenant creates a potential permission for new information from the agent to be entered into the secure memory partition. The selection of an agent to handle a particular customer message creates an active permission for new information from the agent to be entered into the secure memory partition. When a particular customer/agent session ends, the agents access to the secure memory partition is deactivated and permissions revert back to a "potential" state.

Figure 1:
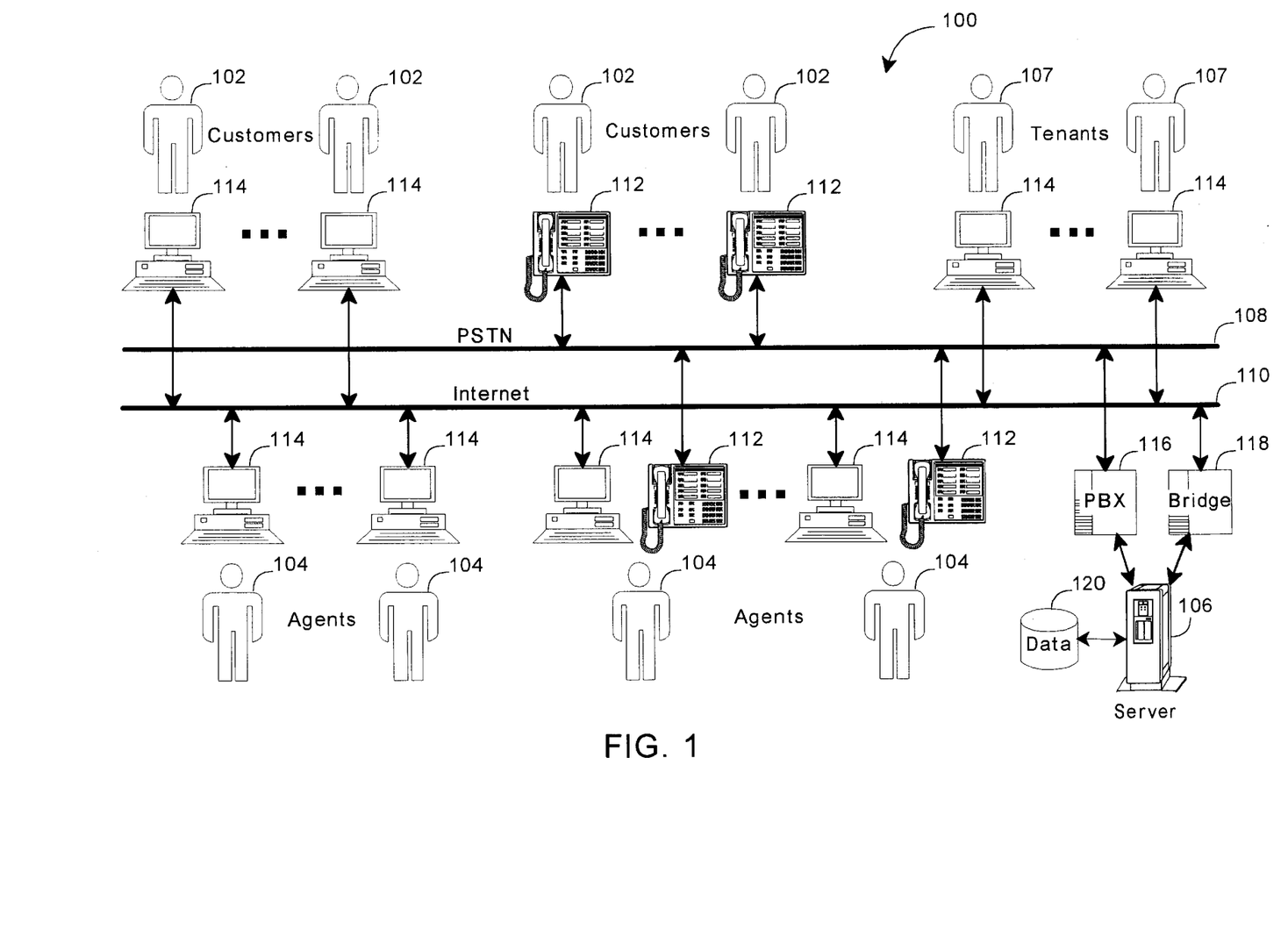
FIG. 1 is a block diagram of a preferred environment of use for apparatus employing the teachings of the present invention.

An exemplary environment of use in which the teachings of the present invention are particularly beneficial is shown in FIG. 1. In a preferred embodiment, a plurality of customers 102 and a plurality of customer service agents 104 are able to communicate with a server 106. Typically, the customers 102 are attempting to contact a customer service agent 104 (via the server 106) for assistance associated with a product or service offered by a particular tenant 107 (i.e., business entity).

Preferably, each customer 102 communicates with the server 106 using one or more communications channels 108, 110. For example, some customers 102 may communicate with the server 106 via a public switched telephone network (PSTN) 108 using a telephone 112 in a known manner. Other customers 102 may communicate with the server 106 via the Internet 110 using a personal computer 114 in a known manner. Still other customers 102 may communicate with the server 106 using other devices such as fax machines (not shown).

Similarily, each customer service agent 104 preferably communicates with the server 106 and/or customers 102 using one or more communications channels 108, 110. For example, some agents 104 may communicate with the server 106 via the Internet 110 using a personal computer 114 in a known manner. Other agents 104 may communicate with customers 102 via the public switched telephone network 108 using a telephone 112, as well as the server 106 via the Internet 110 using a personal computer 114. Still other agents 104 may communicate with the server 106 using other devices such as fax machines (not shown). For security reasons, certain interactions between an agent 104 and the server 106 are preferably routed via an open network connection temporarily established between the agent's computer 114 and the server 106 (as discussed in detail below).

In the preferred embodiment, the server 106 is connected to the PSTN 108 via a public exchange system (PBX) 116. For example, a Lucent G3 may be used. The PBX 116 allows the server 106 to handle a large number of calls simultaneously. Incoming calls may be destined for the same or different telephone numbers. In the preferred embodiment of the present invention, incoming calls destined for the same telephone number are associated with the same tenant 107. Calls destined for different telephone numbers may be associated with the same or different tenants 107. The server 106 determines which tenant 107 a particular incoming call is destined for by using a look-up table as described in detail below (see FIG. 3).

The PBX 116 also allows the server 106 to reroute incoming calls to any telephone 112 connected to the PSTN 108. In this manner, a customer 102 using a telephone 112 may be dynamically connected to a customer service agent 104 using another telephone 112. During a call session, the agent 104 preferably enters data associated with the call session into his personal computer 114. The agent data is then transmitted back to the server 106 via the Internet 110 and stored in a data storage device 120. When the connected agent 104 ends the call session, the PBX 116 may generate a signal indicative of the renewed availability of the agent 104 to handle another customer 102.

The server 106 is preferably connected to the Internet 110 via a connection oriented bridge 118 supporting a form of HTTP tunneling and secure sockets to facilitate secure communications through firewalls. For example, a WebLogic Server may be used. The bridge 118 allows the server 106 to handle a large number of Internet connections simultaneously. The bridge handles incoming agent data from sessions with customers, as well as incoming customer messages. Incoming customer messages may be e-mail messages, Internet chat messages, hypertext transport protocol (HTTP) messages, or any other type of Internet message. For the purpose of simplicity in explanation only, e-mail messages will be used throughout this description. Incoming e-mail messages may be destined for the same Internet address or different Internet addresses. In the preferred embodiment of the present invention, incoming e-mail messages destined for the same address are associated with the same tenant 107. E-mail messages destined for different addresses may be associated with the same or different tenants 107. The server 106 determines which tenant 107 a particular incoming e-mail messages is destined for by using a look-up table as described in detail below (see FIG. 3).

The bridge 118 also allows the server 106 to reroute an incoming e-mail message to any computer 114 connected to the Internet 110. In the preferred embodiment, data associated with the incoming e-mail message is transmitted to a customer service agent 104 via an open network connection to that agent's personal computer 114. In an alternate embodiment, the incoming e-mail message may be forwarded to the agent 104 as another e-mail message addressed to the agent 104. When the agent 104 ends an e-mail session by responding to the customer 102 and/or transmitting agent data to the server 106 via the open network connection, the bridge 118 preferably generates a signal indicative of the renewed availability of the agent 104 to handle another customer 102. Agent responses to customers as well as any other agent data are preferably stored in the data storage device 120.

Figure 2:
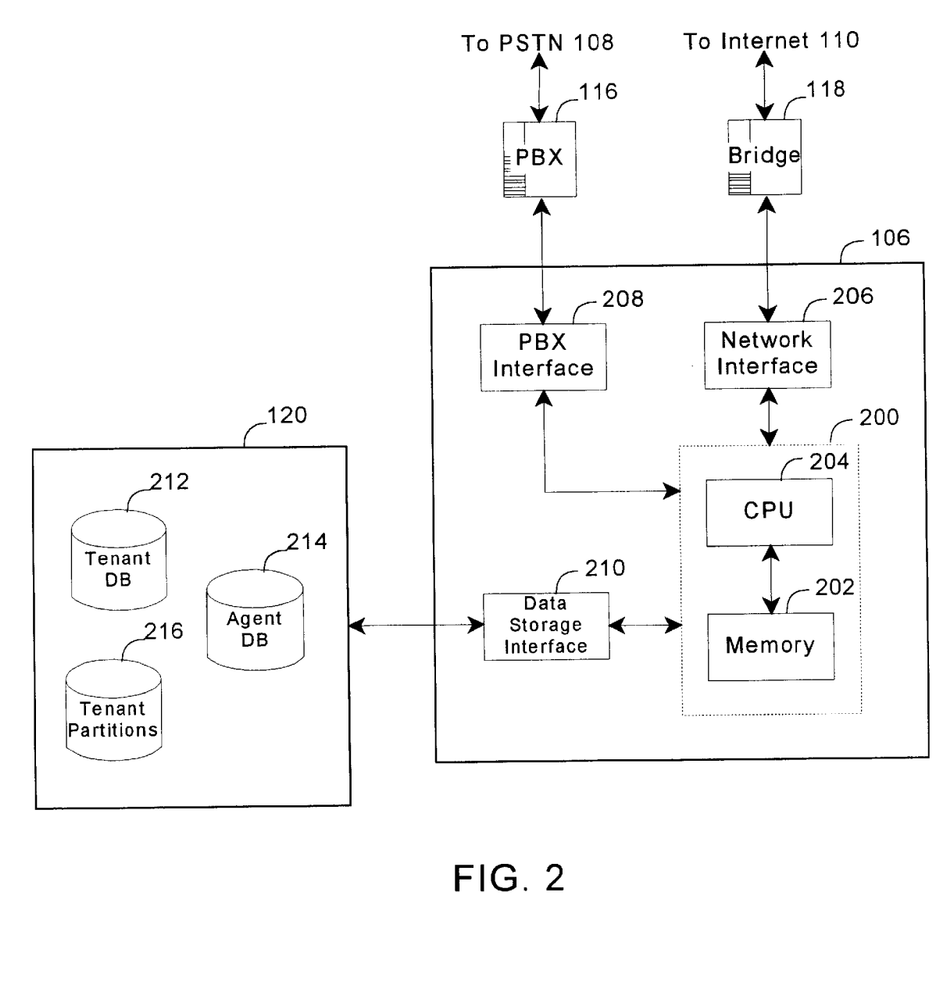
FIG. 2 is a more detailed block diagram of the server and the data storage device of FIG. 1 in accordance with the teachings of the present invention.

A more detailed block diagram of the server 106 and the data storage device 120, in accordance with the teachings of the present invention, is illustrated in FIG. 2. The server 106 may be a general purpose computer programmed to implement the method and/or apparatus of the present invention, or the server 106 may be an application specific device designed to implement the method and/or apparatus of the present invention as is well known to persons of ordinary skill in the art. A controller 200 in the server 106 includes a memory 202 and a microprocessor 204 for program operation. The memory 202 may include random-access memory (RAM) and/or read-only memory (ROM) as is well known. In one embodiment, the memory 202 electronically stores a computer program executed by the microprocessor 204 that implements all or part of the method described below. The memory 202 may be loaded from a fixed memory device such as a hard drive, or the memory 202 may be preloaded with firmware as is well known to persons of ordinary skill in the art. Some of the steps described in the method below may be performed manually or without the use of the server 106.

In a preferred embodiment, the server 106 includes three well known interface circuits. A network interface 206 connects the controller 200 to the bridge 118 for the purpose of providing communication between the microprocessor 204 and the Internet 110. For example, a TCP/IP card may be used. Similarly, a PBX interface 208 connects the controller 200 to the PBX 116 for the purpose of providing communication between the microprocessor 204 and the PSTN 108. Again, a TCP/IP card may be used. Preferably, the PBX interface 208 connects to a CTI port of the PBX 116 and communicates with the PBX 116 using a CTI protocol, as is well known. The interface between the PBX 116 and the PSTN 108 includes a voice path and a control-protocol path. Both paths are present within the PBX 116. Preferably, it is the control-protocol path that is separated by the PBX 116 and externalized as a CTI protocol, such as the Lucent ASAI protocol. In addition, a data storage interface 210 connects the controller 200 to the data storage device 120 for the purpose of providing long term storage. For example, a small computer systems interface (SCSI) circuit may be used or an interface to a database server through a common TCP/IP card could be used. In one embodiment, the network interface 206, the PBX interface 208, and/or the data storage interface 210 may be combined into a single interface circuit (e.g., a TCP/IP circuit).

In the preferred embodiment, the data storage device 120 includes several logically separated data structures. A tenant database 212 stores data associated with each of the tenants 107 that are registered in the system (see FIG. 3). An agent database 214 stores data associated with each of the customer service agents 104 that may participate in the system (see FIG. 4). A plurality of tenant partitions 216 store data associated with individual customer service sessions, including data entered by the agents 104 during those sessions (see FIG. 5).

Figure 3:
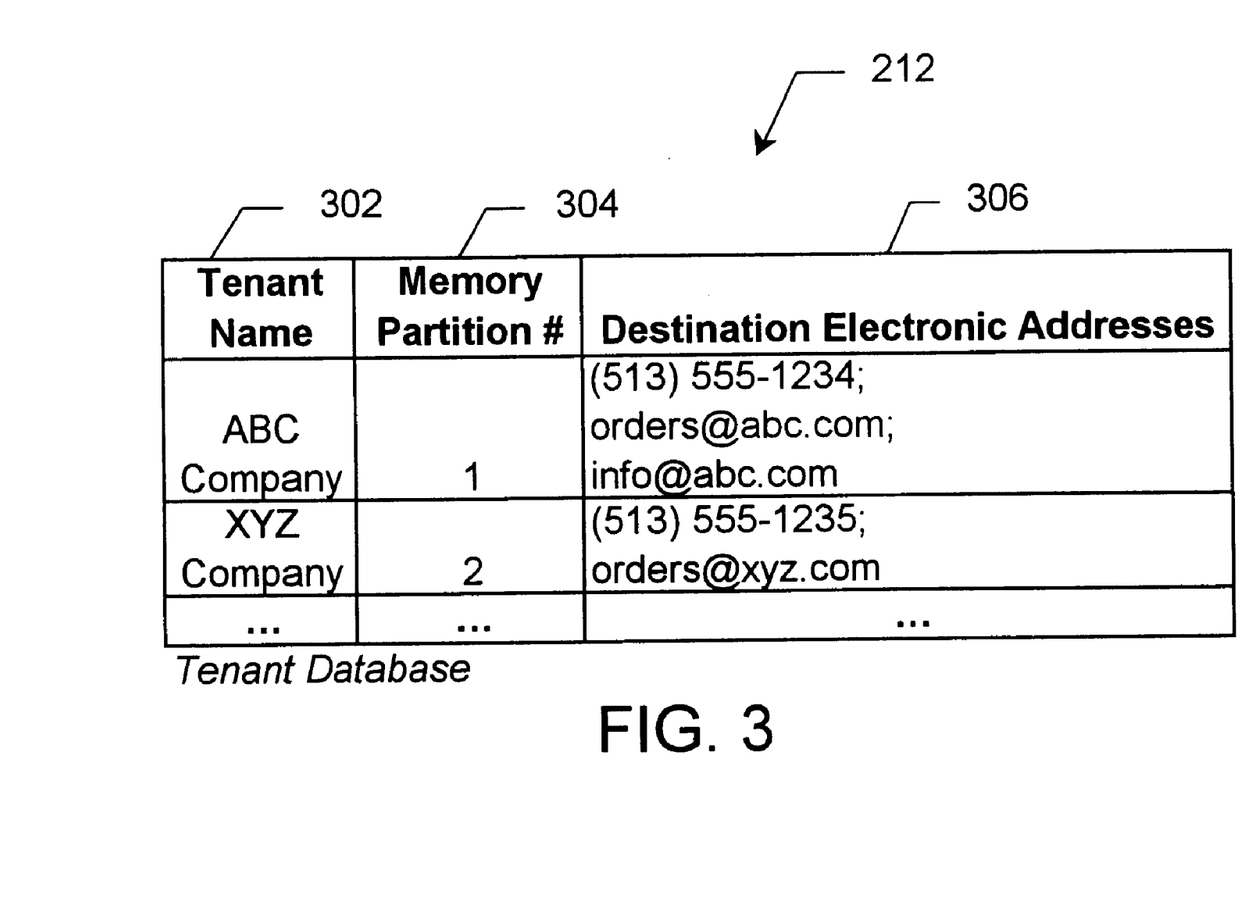
FIG. 3 is a table showing exemplary data stored in the tenant database of FIG. 2.

A table of exemplary data stored in the tenant database 212 is illustrated in FIG. 3. A tenant name field 302 contains the name of the business entity 107 participating in the system. Associated with each tenant name is a memory partition number in partition number field 304. The memory partition number indicates which one of the plurality of tenant partitions 216 is used to store data associated with individual customer service sessions for that tenant 107 (see FIG. 5). Associated with each tenant name and partition number is one or more destination electronic addresses in a destination electronic address field 306. The addresses may include phone numbers, e-mail addresses, fax numbers, Internet protocol chat (IPC) addresses, web page addresses, and/or any other type of electronic address where a customer may go to contact the associated tenant 107. Preferably, each destination electronic address is associated with only one tenant 107.

Figure 4:
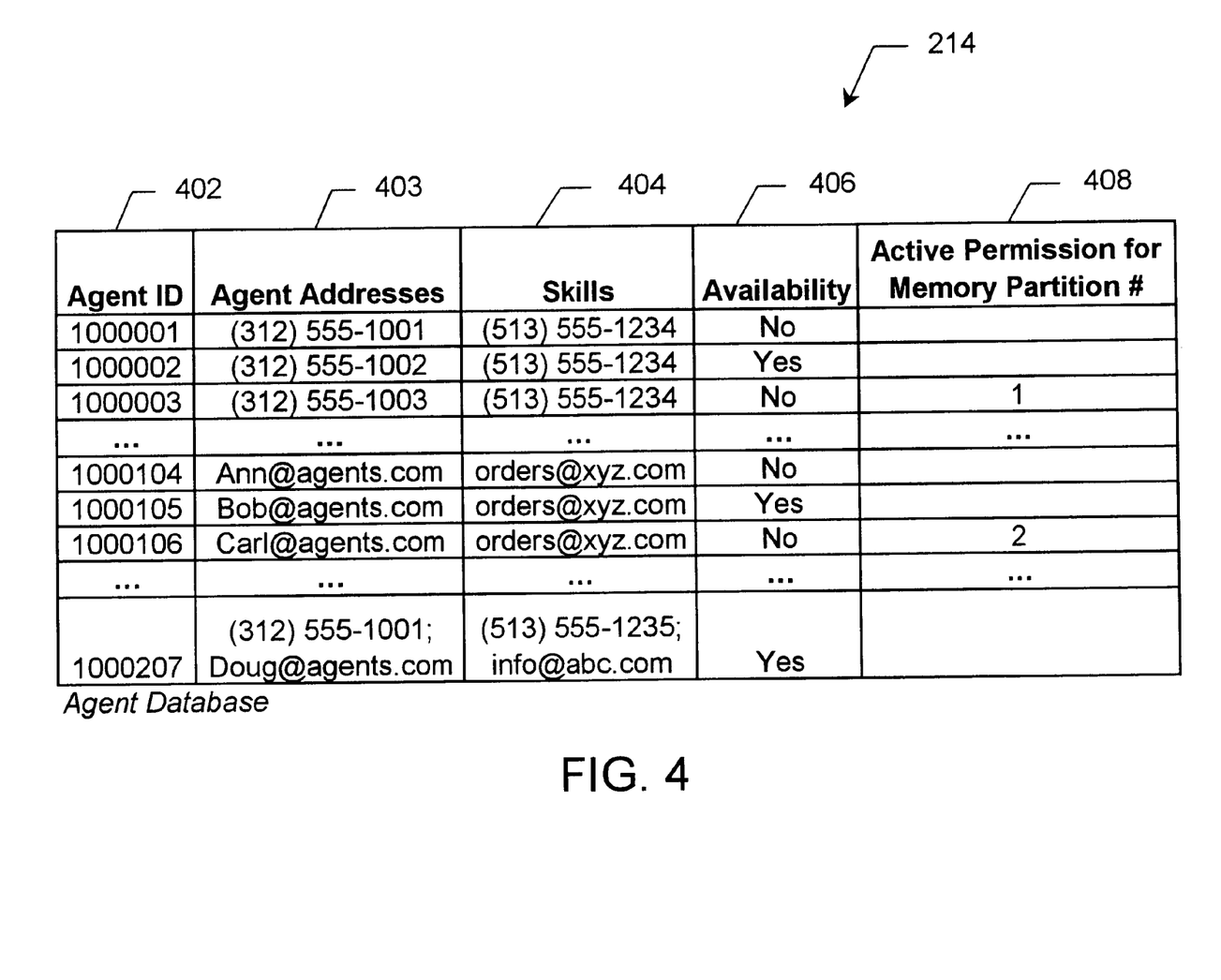
FIG. 4 is a table showing exemplary data stored in the agent database of FIG. 2.

A table of exemplary data stored in the agent database 214 is illustrated in FIG. 4. An agent ID field 402 preferably contains an identification code for each customer service agent 104 registered in the system. Associated with each agent identification code, in an agent address field 403, is one or more electronic addresses (e.g., e-mail address, phone number, etc.) where the agent 104 may be contacted. Also associated with each agent identification code, in a skills field 404, is one or more electronic addresses from the destination electronic addresses field 306 of the tenant database 212. Here, the inclusion of an address indicates that the associated agent 104 possesses the skills necessary (e.g., completed certain training) to handle messages from customers 102 requiring assistance associated with a product or service offered by the associated tenant 107. The availability of each agent 104 may be indicated by an availability field 406. Preferably, in order for an agent 104 to be available, he must be logged in (discussed in detail below) and not currently in a session with a customer 102. When an agent 104 is in a session with a customer 102, the agent 104 is granted active permission to access the memory partition associated with that tenant 107 in the tenant database 212. This temporary state is indicated by a permission field 408 in the agent database 214.

Figure 5:
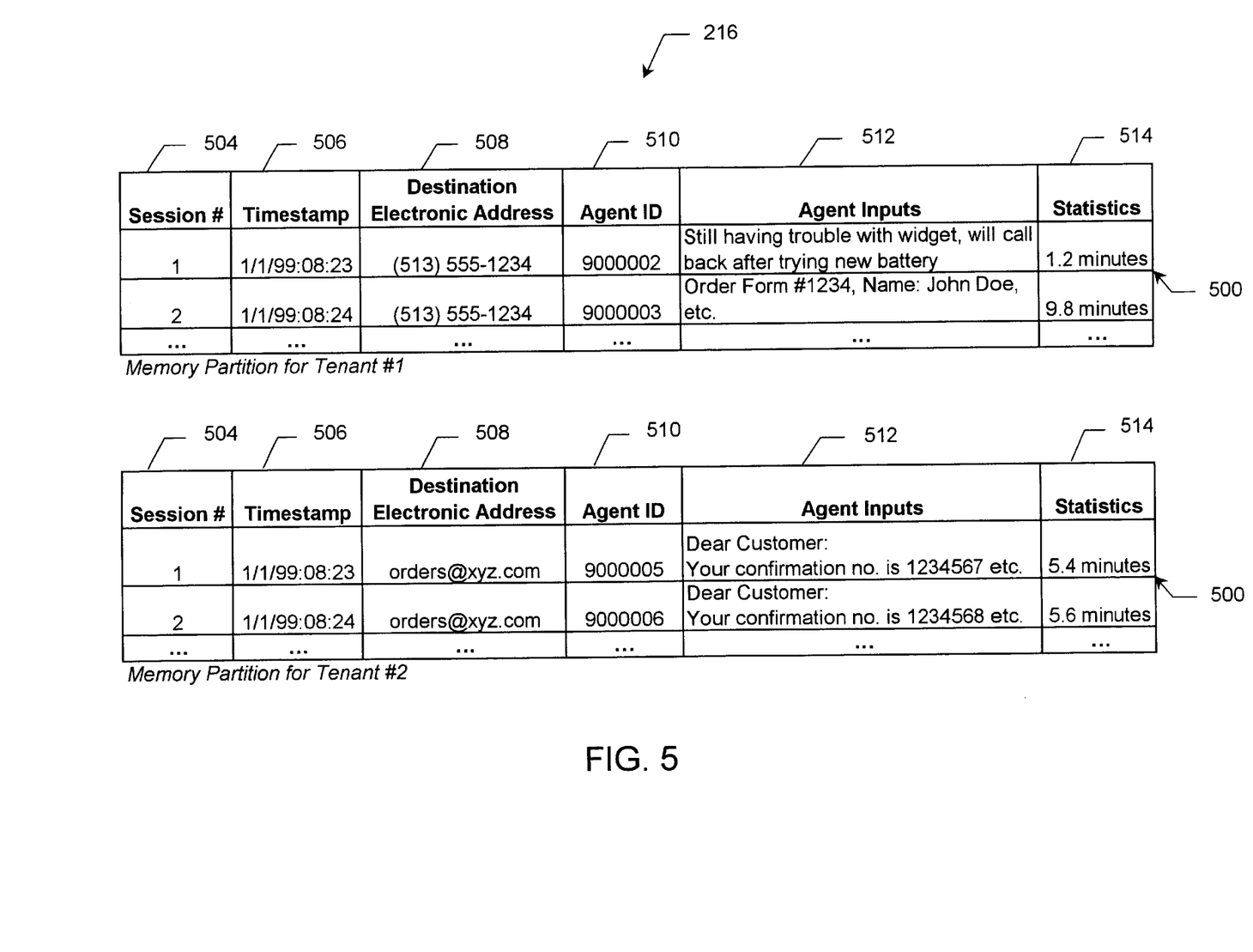
FIG. 5 is two tables showing exemplary data stored in the tenant partitions of FIG. 2.

Two tables of exemplary data stored in the tenant partitions 216 are illustrated in FIG. 5. Each table represents a separate memory partition 500 belonging to a different tenant 107. Two memory partitions are illustrated for explanation purposes only. Any number of tenants 107, and accordingly any number of memory partitions 500, may be used in the scope and spirit of the present invention. A session number field 504 preferably contains a serial number for each interaction between a customer 102 and an agent 104. In the preferred embodiment, a timestamp field 506, destination electronic address field 508, and agent ID field 510 contain data related to each customer/agent session. The timestamp field 506 contains the time the session started or ended. The destination electronic address field 508 contains the electronic address the customer 102 went to in order to initiate the session (e.g., the phone number the customer 102 called or the e-mail address he sent a message to). The agent ID field 510 contains the identification code for the customer service agent 104 that handled the session.

During the handling of each session, the customer service agent 104 preferably enters certain data into his personal computer 114. The agent data is then transmitted to the server 106 via the Internet 110 and the bridge 118 for storage in an agent inputs field 512 of the appropriate memory partition 500. The agent 104 is only allowed to store data in a memory partition 500 that he has active permission for as defined in the permission field 408 of the agent database 214. At the end of each customer/agent session, the agent's permission to access the memory partition 500 is removed (e.g., changed from "active" status to "potential" status). During and/or after each session, certain statistics such as the duration of the session may be gathered by the server 106 and/or the agent's personal computer 114. These statistics may then be stored in a statistics field 514 of the appropriate memory partition 500.

Figure 6:
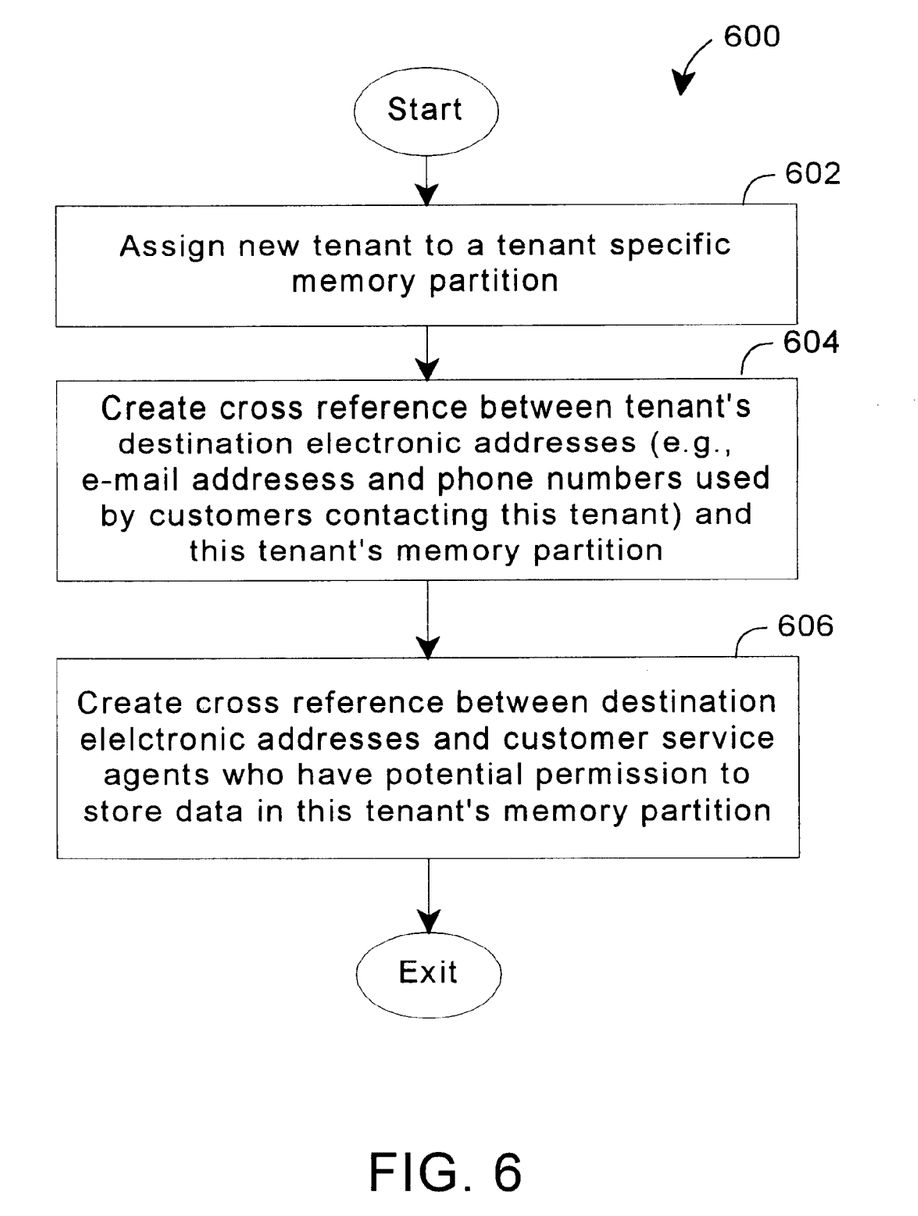
FIG. 6 is a flowchart of a program that can be implemented by the server of FIG. 1 to initialize data in the storage device of FIG. 1.

A flowchart of a program 600 that can be implemented by the server 106 to initialize data in the storage device 120 is illustrated in FIG. 6. Preferably, the steps are performed by the controller 200 each time a new tenant 107 is added to the system. Further, an existing tenant 107 may modify his configuration in a similar manner. The program begins at step 602 where new tenants 107 are assigned to a memory partition 500 in the tenant partitions 216 by writing a number associated with an unused memory partition 500 in the memory partition number field 304 of the tenant database 212. At step 604, the program 600 cross references one or more electronic addresses to the assigned memory partition 500. Electronic addresses include e-mail addresses, phone numbers, etc., that customers 102 may use to contact agents 104 associated with this tenant 107. Preferably, these electronic addresses are written into the destination electronic addresses field 306 of the tenant database 212. Subsequently, at step 606, one or more of these destination electronic addresses are associated with one or more customer service agents 104. Preferably, this association is made by writing the destination electronic addresses into the skills field 404 of the agent database 214.

Figure 7:
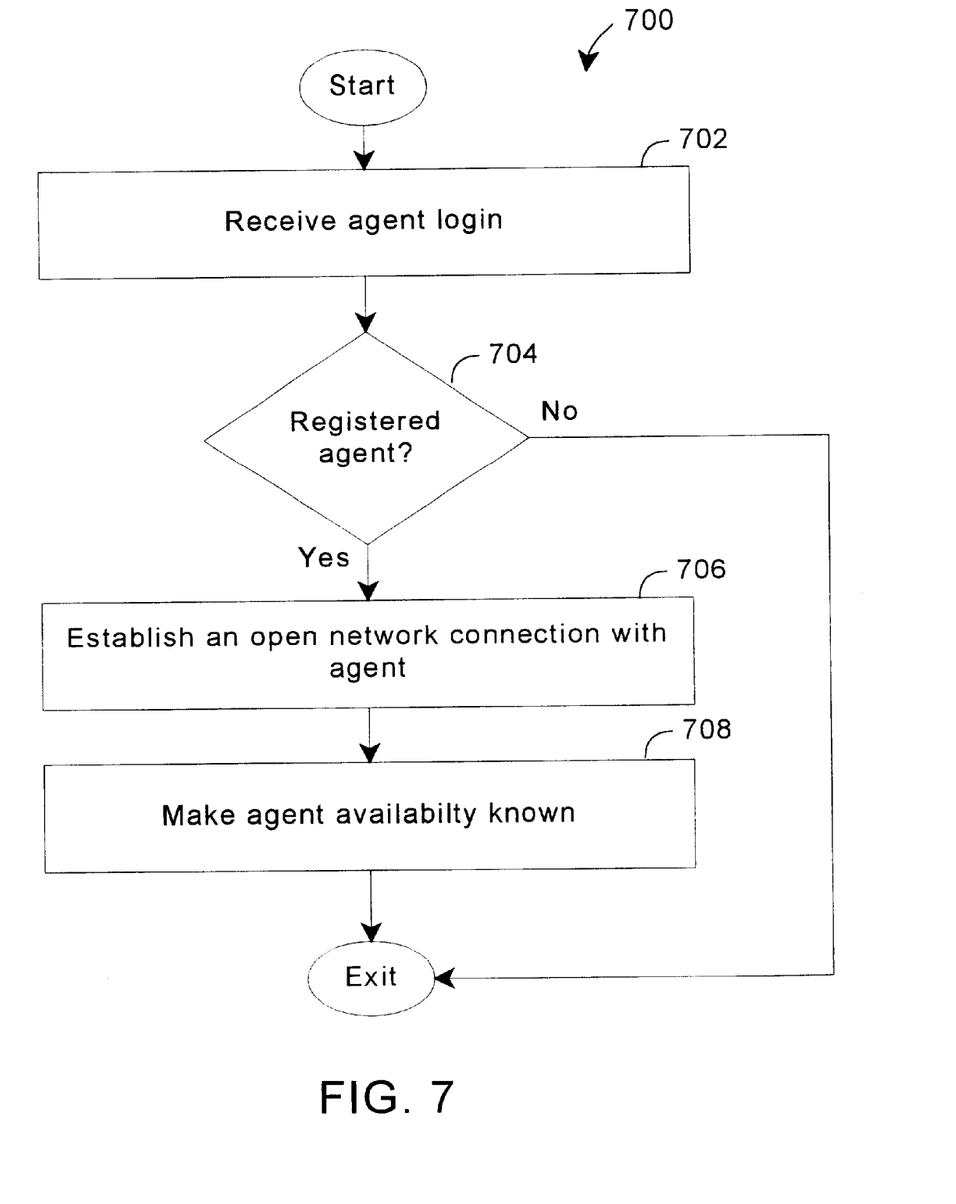
FIG. 7 is a flowchart of a program that can be implemented by the server of FIG. 1 to establish a connection with a customer service agent.

A flowchart of a program 700 that can be implemented by the server 106 to establish a connection with a customer service agent 104 is illustrated in FIG. 7. Preferably, the steps are performed by the controller 200 each time an agent 104 logs in to the server 106. Further, a tenant 107 may log in to the system in a similar manner in order to modify his list of destination addresses, modify which agents 104 may handle his customer's communications, and/or to review agent inputs and other statistics.

The program 700 begins at step 702 where an agent login is received. Agents 104 preferably login using a personal computer 114. The agent login preferably includes an agent identification code. Optionally, the agent login may also include an electronic address where the agent 104 may be contacted. This address may supplement, permanently replace, or temporarily replace the electronic addresses listed (if any) for this agent 104 in the agent address field 403 of the agent database 214. If the received agent identification code does not match one of the agent identification codes in the agent database 214, as determined by step 704, the program 700 exits. However, if the received agent identification code does match one of the agent identification codes in the agent database 214, an open network connection is preferably established between the server 106 and the agent's personal computer 114 at step 706. An open connection allows control interactions to be generated from either the agent or from the server (this facilitates the "pushing" of events to the agent). Subsequently, at step 708, the agent's availability is preferably changed from a "no" status to a "yes" status in the availability field 406 of the agent database 214. When an agent 104 is designated as available, communication events from a customers 102 may be routed to the agent 104 if the agent 104 is also associated with the destination address of the communication event.

Figure 8:
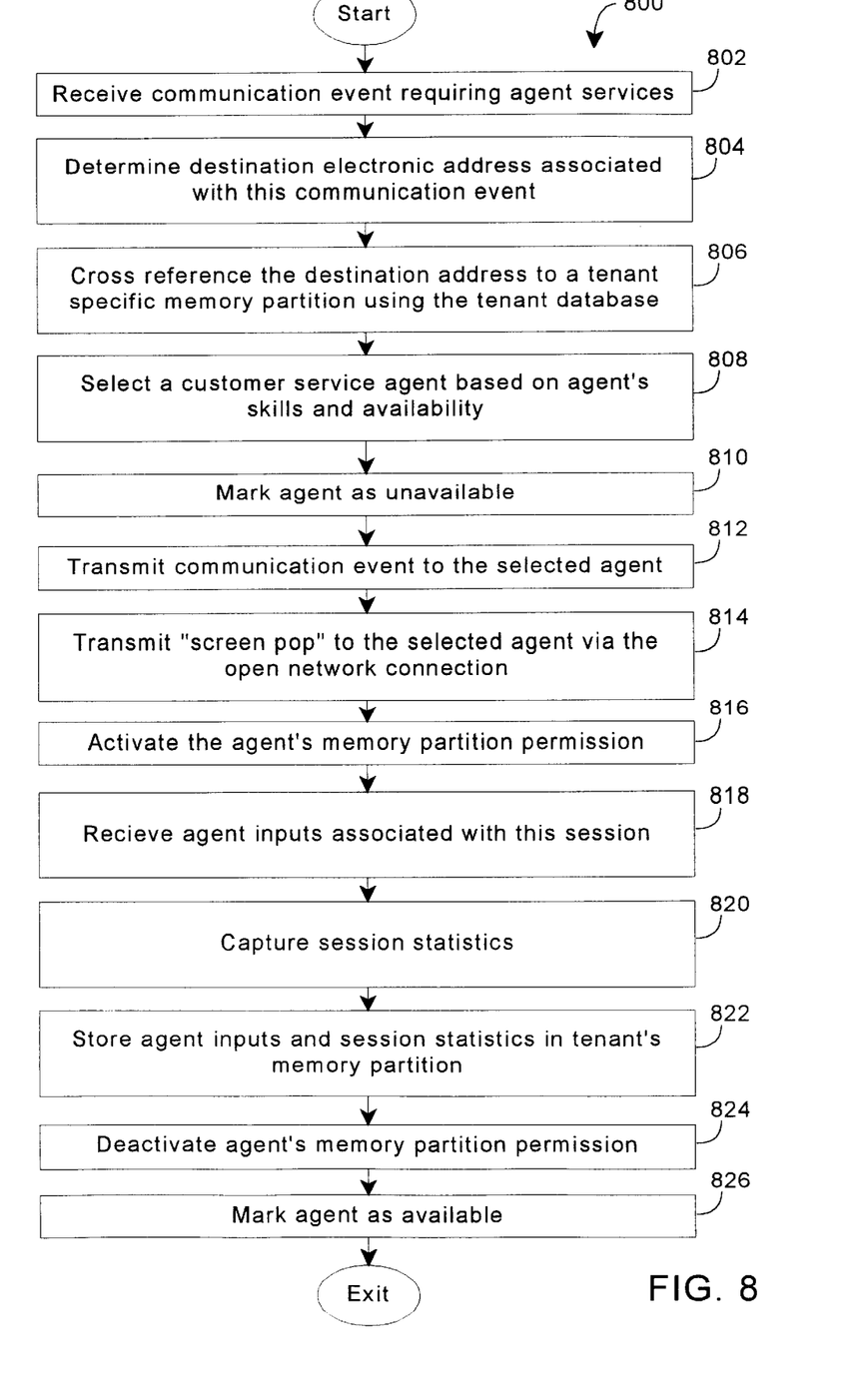
FIG. 8 is a flowchart of a program that can be implemented by the server of FIG. 1 to route a communication event from a customer to a customer service agent and securely collect inputs from the agent.

A flowchart of a program 800 that can be implemented by the server 106 to route a communication event from a customer 102 to a customer service agent 104 and securely collect inputs from the agent 104 is illustrated in FIG. 8. Preferably, the steps are performed by the controller 200 each time a communication event is received by the server 106. Generally, the program 800 receives a message, such as a phone call or an e-mail message, from a customer 102. In response, the program 800 selects a customer service agent 104 to handle the message. The program 800 then routes the message and a "screen pop" to the selected agent 104 and receives information back from the agent 104 via a predetermined open network connection. By only accepting agent inputs via the previously established network connection, the security of the data is increased. The agent information is then stored in a secure memory partition 500 associated with the targeted tenant 107. When a particular customer/agent session ends, the agent's access to the secure memory partition 216 is deactivated (e.g., changed from "active" status to "potential" status).

The program 800 begins at step 802 where a communication event requiring agent services is received. Communication events may include phone calls, e-mail messages, fax messages, web chat messages, and/or any other type of electronic communication. Next, at step 804, the program 800 determines the destination address associated with the received communication event. If the communication event is a phone call, the destination address is preferably a phone number transferred from the PBX 116 to the server 106 in a known manner. If the communication event is an e-mail message, the destination address is preferably an e-mail address transferred from the bridge 118 to the server 106 in a known manner. Once the destination address is determined, the program 800 determines at step 806 which tenant memory partition 500 to use for this session by cross referencing the destination address to a tenant memory partition 500 using the tenant database 212.

A customer service agent 104 is then selected to handle this message at step 808. Agent selection is preferably accomplished by searching the agent database 214 for a record containing a "yes" value in the availability field 406 and an address in the skills field 404 matching the destination address determined in step 804. Of course, a person of ordinary skill in the art will readily appreciate that a match need not be an exact match. For example, the phone number "513-555-1234" may be considered a match with the phone number "5135551234". Once an agent 104 is selected, the associated availability field 406 in the agent database 214 is preferably amended at step 810 to indicate a "no" value. In this manner, this particular agent 104 will not be selected to handle another communication event while he is busy handling the current communication event.

Once an agent 104 is selected, the communication event is transmitted to the agent 104 at step 812. If the communication event is a phone call, the phone call is preferably routed to the agent's telephone 112 via the PBX 116 in a known manner. The agent's phone number may be determined from the agent address field 403 of the agent database 214. If the communication event is an e-mail message, the contents of the e-mail message are preferably routed to the agent's personal computer 114 via the bridge 118 using the open network connection established in step 706 in a known manner. In an alternate embodiment, the e-mail message may be routed to the agent's personal computer 114 via the bridge 118 using an e-mail address associated with the agent 104. The agent's e-mail address may be determined from the agent address field 403 of the agent database 214.

In addition to the communication event, a "screen pop" is preferably transmitted to the agent's personal computer 114. The "screen pop" is preferably transmitted via the bridge 118 using the open network connection established in step 706 in a known manner. The "screen pop" may contain information known about the customer 102 and/or prompts for information needed from the customer. In one example, the "screen pop" may include information entered by a previously selected customer service agent 104 regarding an earlier session. In another example, the "screen pop" may contain a customer order form to be electronically completed by the agent 104.

The agent 104 then responds to the message and the "screen pop" by entering information into his personal computer 114. These agent inputs are then transmitted to the server 106 via the bridge 118. In the preferred embodiment, the open network connection is used to transmit the agent inputs to the server 106. However, a person of ordinary skill in the art will readily appreciate that any communication means, such as an e-mail message, may be used.

In order to store the agent inputs in the tenant partitions 216, at step 816 the agent 104 is given temporary permission (i.e., activate the agent's potential permission) to access the memory partition 500 determined in step 806. Preferably, permission is given by amending the permission field 408 associated with this agent 104 in the agent database 214 to include the number of the tenant's memory partition 500. Subsequently, when agent inputs are received at step 818, and/or statistics associated with the session (e.g., duration of the session) are captured at step 820, they are stored only in the appropriate memory partition 500 at step 822. Preferably, agent inputs are stored in the agent inputs field 512 of the memory partition 500, and captured statistics are stored in the statistics field 514 of the memory partition 500.

When a customer/agent session ends, the program 800 preferably deactivates the agent's permission at step 824 by clearing the permission field 408 associated with this agent 104 in the agent database 214 at step 824. Similarly, at step 826, the agent's availability is preferably changed from a "no" status to a "yes" status in the availability field 406 of the agent database 214.

In summary, persons of ordinary skill in the art will readily appreciate that methods and apparatus for electronically routing a communication event from a customer to a customer service agent and collecting agent inputs in a secure multi-media/multi-tenant environment have been provided. Systems implementing the teachings of the present invention may be used to handle more than one tenant and more than one type of message, thereby allowing a plurality of relatively smaller tenants or tenants with dynamic message processing requirements to be aggregated into one cost effective system. Further, a single agent may easily handle different message types and/or customers of different tenants.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of electronically routing a communication event from a customer to a customer service agent and collecting agent inputs in a secure multi-media/multi-tenant environment, the method comprising the steps of:

correlating a first telephone number to a first computer memory partition, the first computer memory partition being associated with a first tenant;

correlating an e-mail address to a second computer memory partition, the second computer memory partition being associated with a second tenant, the first tenant and the second tenant being distinct business entities;

correlating a first customer service agent to the first computer memory partition, and a second customer service agent to the second computer memory partition;

receiving the communication event from the customer;

transmitting the communication event to the first customer service agent at a second telephone number if the communication event is directed to the first telephone number;

receiving first agent inputs from the first customer service agent; and storing the first agent inputs exclusively in the first computer memory partition.

2. A method as defined in claim 1, further comprising the step of receiving first login information from the first customer service agent, and second login information from the second customer service agent, the first login information including a first agent identification code and the second telephone number, the second login information including a second agent identification code and a network address.

3. A method as defined in claim 2, further comprising the step of transmitting the communication event to the second customer service agent at the network address if the communication event is directed to the e-mail address.

4. A method as defined in claim 3, further comprising the steps of receiving second agent inputs from the second customer service agent, and storing the second agent inputs exclusively in the second computer memory partition.

5. A method as defined in claim 2, further comprising the steps of:

correlating a third telephone number to the first computer memory partition;

correlating a third customer service agent to the first computer memory partition;

receiving third login information from the third customer service agent, the third login information including a third agent identification code and a fourth telephone number;

transmitting the communication event to the third customer service agent at the fourth telephone number if the communication event is directed to the third telephone number;

receiving third agent inputs from the third customer service agent; and storing the third agent inputs exclusively in the first computer memory partition.

6. A method of electronically routing a communication event from a customer to a customer service agent and collecting agent inputs in a secure multi-media/multi-tenant environment, the method comprising the steps of:

correlating a first telephone number to a first computer memory partition, the first computer memory partition being associated with a first tenant;

correlating an e-mail address to a second computer memory partition, the second computer memory partition being associated with a second tenant, the first tenant and the second tenant being distinct business entities;

correlating a first customer service agent to the first computer memory partition, and a second customer service agent to the first computer memory partition and the second computer memory partition;

receiving first login information from the first customer service agent, and second login information from the second customer service agent, the first login information including a first agent identification code and a second telephone number, the second login information including a second agent identification code, a third telephone number, and a network address;

receiving the communication event from the customer;

transmitting the communication event to the second customer service agent at the network address if the communication event is directed to the e-mail address;

determining a selected telephone number based on the second telephone number and the third telephone number if the communication event is directed to the first telephone number;

transmitting the communication event to the selected telephone number if the communication event is directed to the first telephone number;

receiving first agent inputs from the first customer service agent, and second agent inputs from the second customer service agent; and storing the first agent inputs exclusively in the first computer memory partition, and the second agent inputs exclusively in the second computer memory partition.

7. An apparatus for electronically routing communication events from customers to customer service agents and storing agent inputs, the apparatus comprising:

a telephone interface circuit for electronically communicating with a telephone network;

a network interface circuit for electronically communicating with the Internet;

a data storage device having a first memory partition associated with a first tenant and a second memory partition associated with a second tenant, the first tenant and the second tenant being distinct business entities, the data storage device storing a first destination address logically associated with the first memory partition, the data storage device storing a second destination addresses logically associated with the second memory partition, the data storage device storing first agent input data logically associated with the first memory partition, the data storage device storing second agent input data logically associated with the second memory partition; and a controller operatively coupled to the telephone interface circuit, the network interface circuit, and the data storage device, the controller causing a phone call to be routed from a first customer to a first customer service agent located at the first destination address using the telephone interface circuit, the controller receiving first agent inputs from the network interface circuit, the controller causing the data storage device to store the first agent inputs in the first memory partition, the controller causing an e-mail message to be routed from a second customer to a second customer service agent located at the second destination address using the network interface circuit, the controller receiving second agent inputs from the network interface circuit, the controller causing the data storage device to store the second agent inputs in the second memory partition.

* * * * *